United States Patent [19]

Kapucinski

[11] Patent Number: 4,502,240
[45] Date of Patent: Mar. 5, 1985

[54] DIP NET AND MINNOW BUCKET AERATOR

[76] Inventor: Vernon Kapucinski, R.D. #2, Joppa Rd., Huron, Ohio 44839

[21] Appl. No.: 509,316

[22] Filed: Jun. 30, 1983

[51] Int. Cl.³ .................... A01K 77/00; A01K 97/04
[52] U.S. Cl. .......................................... 43/11; 43/57; 119/5
[58] Field of Search ...................... 119/5; 43/7, 11, 57

[56] References Cited
U.S. PATENT DOCUMENTS

| 2,408,306 | 9/1946 | Flournoy | 43/57 |
| 2,560,672 | 7/1951 | Volenec et al. | 43/57 |
| 3,348,330 | 10/1967 | Gilliam | 43/57 |
| 3,747,250 | 7/1973 | Willinger | 43/11 |
| 4,034,710 | 7/1977 | Carter | 43/11 |

Primary Examiner—Robert P. Swiatek
Assistant Examiner—Kris R. Schulze
Attorney, Agent, or Firm—Gustalo Nunez

[57] ABSTRACT

This invention is directed to a new and novel device for oxygenating water containing apparatus for sustaining life of live bait contained in said water containing apparatus. The device consists of an aspiration bulb connected to a hollow tube which is affixed to a wire framed net. When the bulb is compressed, is forced through and out of the tube and by design, is forced to pass over the wire framed mesh net which disburses the air flow over a larger area and the water containing apparatus.

1 Claim, 2 Drawing Figures

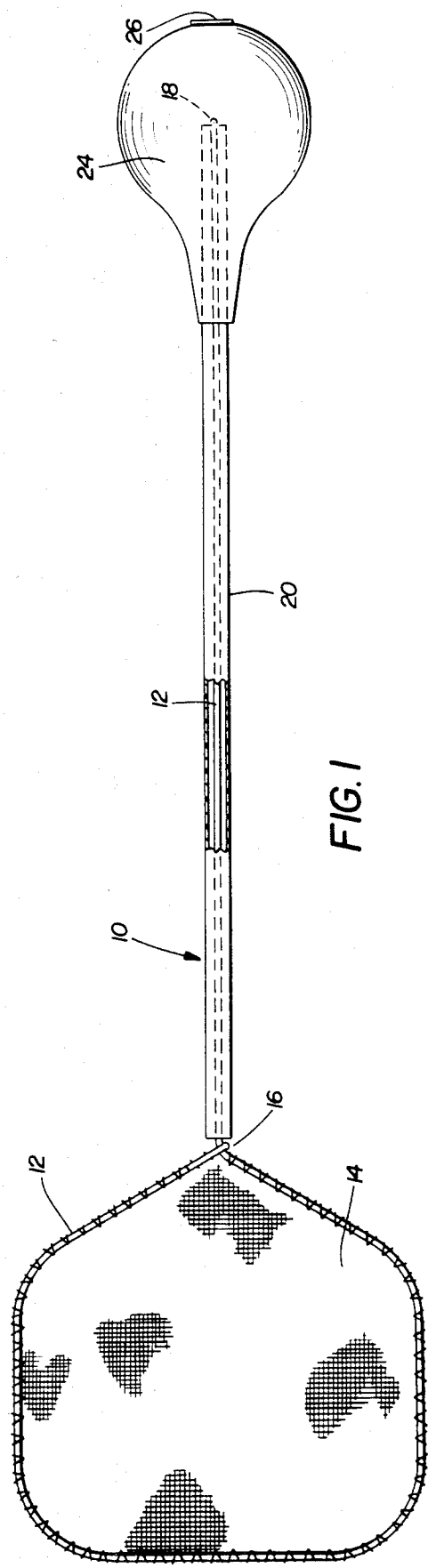
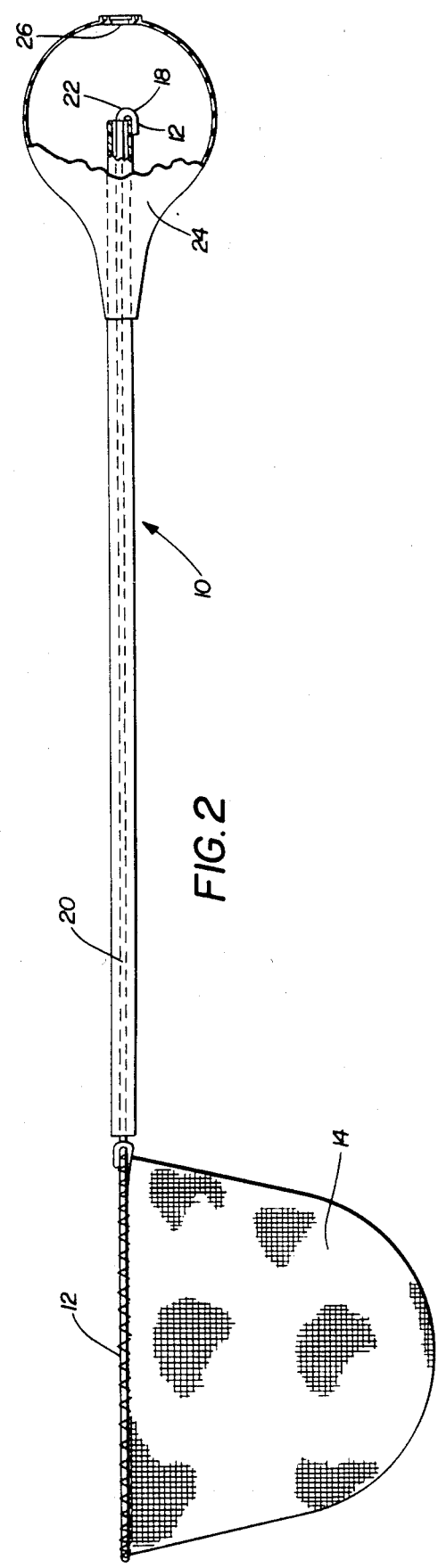

DIP NET AND MINNOW BUCKET AERATOR

BACKGROUND OF THE INVENTION

1. Field of the Invention

The invention contemplated here is for use primarily by amateur fisherman and specifically for preserving small bait as naturally as possible. The term small bait is directed to a type of small fish known as minnows, but also includes other various species such as suckers, smelt, sculpins. This type of bait can be kept in bait buckets which can be easily handled by a fisherman whether on the ground or a boat. It is a fact that most game fish are predatory, hence, small fish are their natural forage. It is for this reason that minnows are perhaps the most reliable of all freshwater live baits, and particularly with respect to trophy like fish. The larger the game fish, the more there is a dependability upon small fish for food, therefore, minnows are excellent bait.

Fisherman do not always fish where there is access to bait stores, hence, they must take bait with them. The fisherman who can buy live minnows whenever and wherever he wants them is most fortunate. However, bait such as minnows are kept alive and transported with difficulty, therefore, the proper equipment must be used in transporting them and preserving them. Two things are responsible for the death of minnows, overcrowding and warm water. Both of these problems cause a shortage of oxygen. It is well known that minnows require less oxygen in cold water.

The object of the invention is to provide a relatively simple tool that can be used by fisherman in retrieving minnows from a minoow bucket and for simultaneously providing oxygen to the water.

The instant invention consists of a minnow net connected to a hollow handle. The hollow handle is then connected to an aspirator having an opening at one end. The applicant's invention drastically minimizes the money that fisherman are now paying for apparatus used in oxygenating the water for the preservation of minnow life.

2. Prior Art

A novelty search was not conducted for the instant invention, however, the applicant states that there is apparatus on the market for oxygenating water and that such apparatus consists of electric and battery operated pumps. These are expensive and not always reliable as that contemplated by the applicant.

DESCRIPTION OF THE DRAWINGS

FIG. 1. Top plan view, partial cross sectional view of the invention.

FIG. 2. Side plan view, partial cross sectional view of the invention.

DESCRIPTION OF THE PREFERRED EMBODIMENT

Referring to FIG. 1, the Improved Dip Net and Minnow Bucket Aerator is shown generally at 10.

The Improved Dip Net and Minnow Bucket Aerator is comprised of a wire frame 12 bent, in this instance, in a retangular shape with rounded corners. It is noted however, that any shape would work, whether it be circular, elliptical, elongated, etc. Connected and affixed to the frame 12 is a closed mesh net 14. The frame 12 closes on itself at 16 and one end 18 projects therefrom for a predetermined distance. An elongated hollow tube 20 is projected over the end 18 up to where the frame 12 closes at 16. At the end opposite 16, end 18 is bent over the terminating end of the hollow tube 20 at 22. An aspirator bulb 24 is inserted over the hollow tube 20 forming an air tight relationship with the hollow tube 20. The aspirator bulb has an opening 26 at one end thereof.

In operation, the Improved Dip Net and Minnow Bucket Aerator 10 is to oxygenate water containing aquatic life such as minnows. The manner by which this function is accomplished is to insert the device 10 into a bucket containing the minnows. While holding the aspirator bulb 24 in one hand, and the net end submerged in the water the user sequeezes the aspirator bulb 24. However, the opening 26 must be plugged with the users hand or portion thereof, thus when the aspirator bulb 24 is squeezed, air is forced through the hollow tube 20 and into the water.

The net 14, serves a dual purpose in the instant invention. It is used to retrieve minnows from the water. The other function performed by the net 14, is that when air is forced through the hollow tube 20, the net 14 facilitates the oxygenation process by breaking up and distributing the air bubbles which are created when the air is forced into the water by the squeezing of the aspirator 24.

After each squeeze of the aspirator 24, the hand pressure closing the opening 26 must be released inorder that a new supply of air is admitted into the aspirator 24. In the instant invention, the area surrounding the opening 26 is corrugated inorder to make the opening easier to find, particularly in the night season. It has been found that the compression of the aspirator 24 can be easily accomplished while simultaneously holding one's thumb over the opening 26.

In order to provide the life sustaining oxygen to the water, the above described process must be accomplished several times approximately every fifteen to twenty minutes depending on the number of minnows and the size of the container.

The hollow tube 20 is preferably made out of a sturdy plastic material and the aspirator bulb 24, preferably out of a rubber based material. The difference in the outside diameter of the wire 12 and the inside diameter of the hollow tube 10 is such that there is sufficient space between the two to enable the air to be evacuated from the aspirator bulb 24, through the tube 20 and into the water. The difference in diameters is the reason that the wire must be bent at 22, which retains the tube 24 to the frame 12.

What is claimed is:

1. An improved dip net and oxygenating device for water containers, comprising;
    (a) an elongated wire material formed into the shape of a closed loop and having a handle extending away from said loop to a terminating end,
    (b) a net member attached to said loop,
    (c) a rigid hollow tube adapted to be projected over said extending handle up where said loop begins, said terminating end bent over one end of said hollow tube thereby engaging and retaining said hollow tube in a fixed relationship, and,
    (d) a compressible flexible bulb attached to said hollow tube, in an air tight relationship said bulb having an opening thereon, and operating such that when said opening is closed and said bulb is compressed, air is thereby forced through said hollow tube in a space created between said hollow tube and said extending handle, said air being deflected by said wire loop and distributed over a wide area.

* * * * *